United States Patent [19]
Perol

[11] Patent Number: 5,249,113
[45] Date of Patent: Sep. 28, 1993

[54] DC TO DC CONVERTER OF THE PUSH-PULL TYPE WITH MOSFET SWITCHES

[75] Inventor: Philippe A. Perol, La Haye, Netherlands

[73] Assignee: Agence Spatiale Europeenne, Paris, France

[21] Appl. No.: 830,392

[22] Filed: Feb. 3, 1992

[30] Foreign Application Priority Data

Feb. 5, 1991 [FR] France .................. 91 01267

[51] Int. Cl.⁵ .......................................... H02M 3/337
[52] U.S. Cl. ...................................... 363/24; 363/133; 323/362
[58] Field of Search .................. 363/22≧25, 363/133; 323/362

[56] References Cited

U.S. PATENT DOCUMENTS 4,969,078 11/1990 Yamamoto et al. ................ 363/24

FOREIGN PATENT DOCUMENTS 0077958 10/1982 European Pat. Off. .
0303994 8/1988 European Pat. Off. .
2627644 2/1988 France .

Primary Examiner—Emanuel T. Voeltz
Attorney, Agent, or Firm—Ron Fish

[57] ABSTRACT

The converter comprises a transformer having two primary windings; a voltage source having one of its terminals connected to the center tap; and two switches connected in series between the other terminal of the voltage source and a respective one of the primary windings, the switches having stray capacitances that impose a transition time between one of the switches switching OFF and the other switch switching ON. The transformer comprises a magnetic circuit having a gap, and each primary winding has a number of turns that is determined essentially as a function of the level of losses acceptable within the magnetic circuit, the size of the gap then being adjusted, taking account of the number of turns and the operating frequency, in such a manner as to reduce the magnetizing inductance of the transformer to a value such that said transition time is less than a given threshold corresponding to tolerances of the form factor.

5 Claims, 3 Drawing Sheets

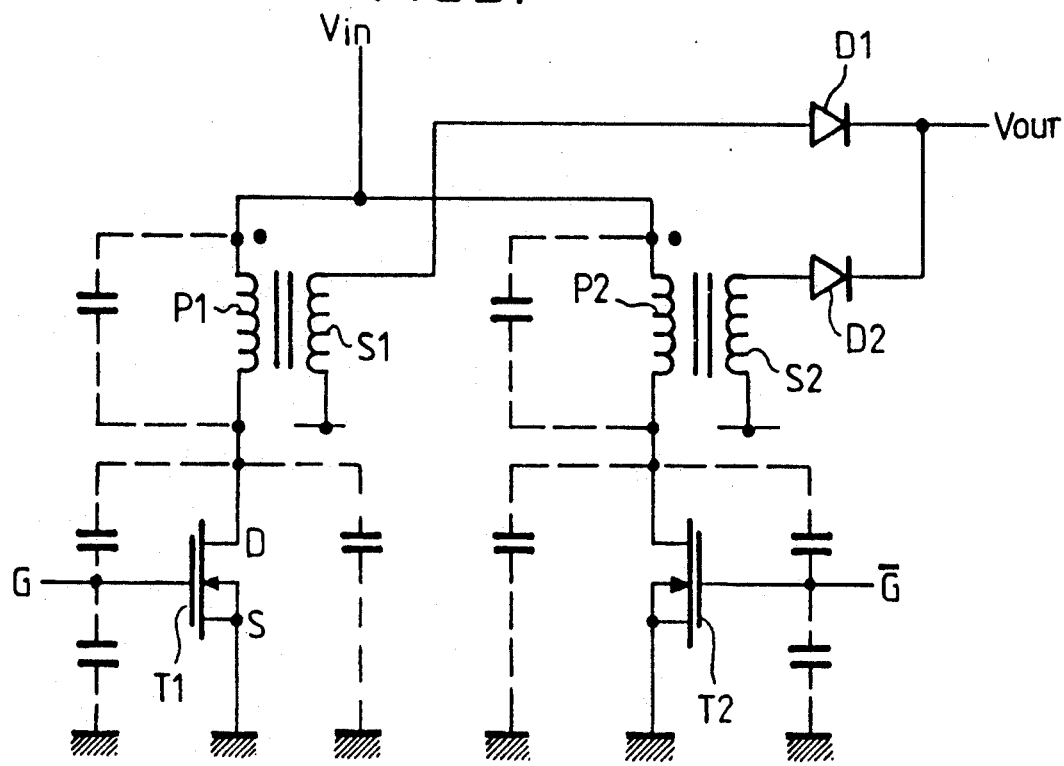
FIG_1
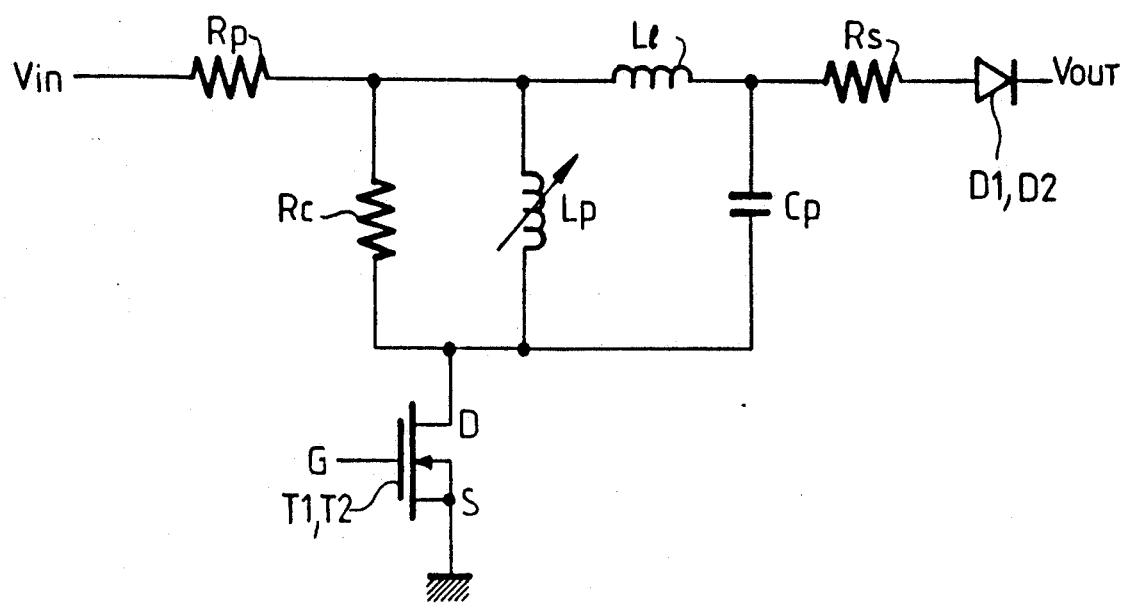
FIG_2

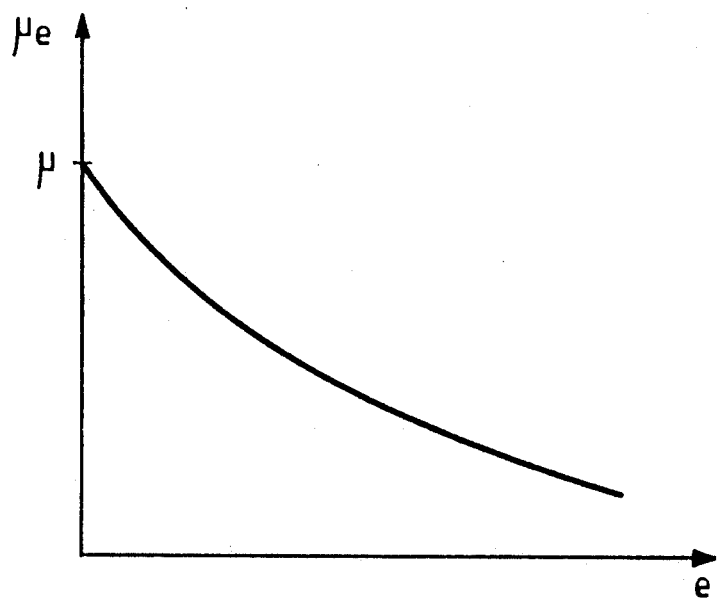
FIG_3
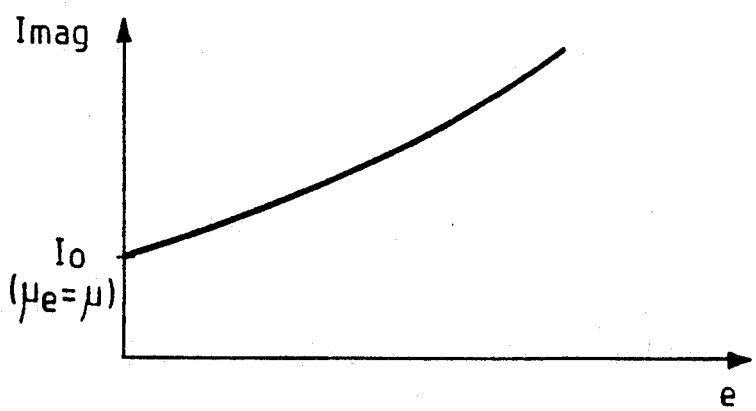
FIG_4
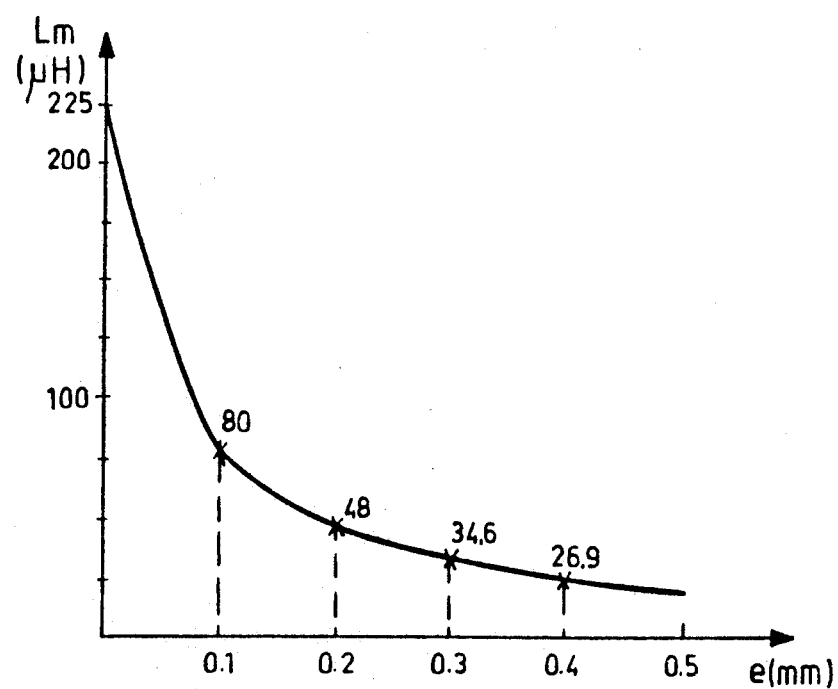
FIG_5

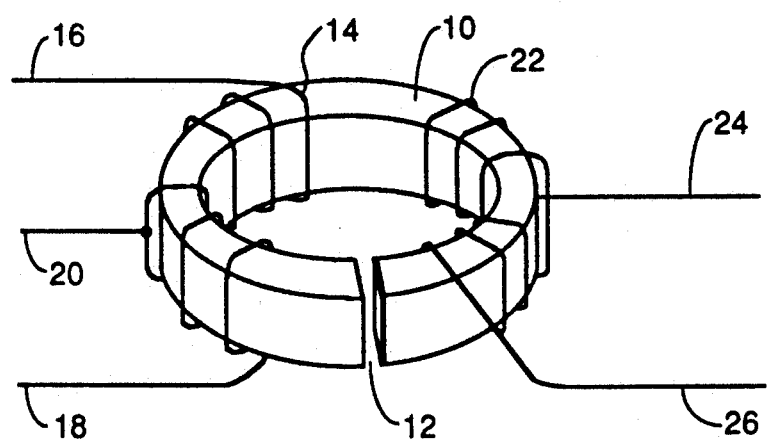
FIG _ 6

DC TO DC CONVERTER OF THE PUSH-PULL TYPE WITH MOSFET SWITCHES

The invention relates to DC-DC converters, in particular to those of the push-pull type with MOSFET switches.

BACKGROUND OF THE INVENTION

DC to DC converters are essentially built up around a transformer having two primary windings mounted in opposition and each connected in turn to a constant voltage source via appropriate switching means.

On each alternation, such switching, which may optionally be the result of self-oscillation in the circuit, produces a corresponding reversal of the magnetic flux in the transformer, thereby making it possible to take an alternating voltage from a secondary winding of the transformer, which alternating voltage is then rectified and filtered in appropriate manner.

In such converters, the size (and thus the weight) of the apparatus is reduced by increasing the operating frequency at which the primary windings are switched in alternation. When attempts are made to increase this operating frequency, it becomes particularly advantageous to use MOSFET type transistors as the switching means because of their excellent switching performance at high frequency.

However, these components, in particular high power MOSFETs, have stray capacitance which is far from negligible, both between drain and source and between drain and grid. That is why the switching cycle used with such components must take account of the charging and discharging times of these stray capacitances at the switching rate.

Since such alternating charging and discharging is inevitable, it is particularly important to design the circuit of the converter so that in spite of this phenomenon switching takes place without losses and with as little degradation as possible of the form factor, which parameter governs the operating efficiency of the converter.

In this respect, although it is possible to ensure that the charging and the discharging of the stray capacitances of the MOSFETs takes place without losses, it is also essential for the charging and discharging times (which correspond to a transition or "switching interval" stage during which the converter is not transferring power) should be adjusted to the selected switching frequency.

Thus, taking a push-pull converter operating at 200 kHz as an example, the maximum conduction time is 2.5 $\mu$s in each leg, in which case it is not acceptable for the switching interval to exceed 1 $\mu$s since the conduction time of the transistors would then become too short, thereby excessively degrading the form factor.

This problem is even more critical when MOSFETs are used as the switching means since under such circumstances the capacitance of the MOSFETs predominates over the stray capacitance of the transformer, which means that it is not possible to determine the duration of the switching interval by the characteristics of the transformer (reference may be made in this respect to U.S. Pat. No. 4,443,840 which describes a converter using conventional transistors and the intrinsic resonance of the transformer and the output rectifier to adjust the duration of the switching interval to the operating frequency, which could not be done using MOSFETs).

One of the objects of the present invention is to provide means for adjusting the duration of the switching interval to the operating frequency in a converter where the capacitance of the switching means is greater than the capacitance of the transformer, with this typically applying to converters in which switching is performed by MOSFETs.

A converter of this type is described, for example, in FR-A-2 627 644 in the name of the present Applicant. This document describes a switching mode according to which the stray capacitance of the MOSFETs is taken into account, but it does not in any way suggest adjusting the duration of the switching interval as a function of the selected switching frequency.

In addition, as described below, the means proposed by the present invention for adjusting the duration of the switching interval are independent of the circuit diagram and of the various electrical parameters concerned, and can therefore be applied equally well to resonant type converters (i.e. those that operate by spontaneous oscillation) and to non-resonant converters (i.e. those operating by forced oscillation), and similarly it can be applied equally well to current-controlled converters and to voltage-controlled converters.

SUMMARY OF THE INVENTION

The present invention provides a DC to DC converter of the above-specified type (as described for example in above-mentioned FR-A-2 627 644), i.e. a converter comprising: a transformer having two primary windings connected in opposition on either side of a center tap; a constant voltage source having one of its terminals connected to the center tap of the transformer; and two switches, in particular MOSFETs, each connected in series between the other terminal of the voltage source and a respective one of the primary windings, and controlled in such a manner as to connect said other terminal of the voltage source periodically and in alternation to one or the other of the primary windings, said switches presenting, on switching, stray capacitance that needs to be charged and discharged, thereby imposing a transition time between one of the switches switching OFF and the other switch subsequently switching ON.

The transformer comprises a magnetic circuit having a gap, and each primary winding has a number of turns that is determined essentially as a function of the level of losses acceptable within the magnetic circuit, the size of the gap then being adjusted, taking account of the number of turns and the switching frequency, in such a manner as to reduce the magnetizing inductance of the transformer to a value such that said transition time is less than a given threshold corresponding to tolerances of the converter's form factor.

In other words, the number of turns in the primary is determined by the level of acceptable losses and not by the desired magnetizing inductance (this choice is justified in the description below).

Proposals have indeed already been made to provide a converter using a magnetic circuit having a gap (see EP-A-0 303 994), but the circuit proposed therein seeks to reduce the primary inductance of the transformer, and not the transition time between the switches switching OFF and ON, which problem arises only for high power MOSFETs having stray capacitance greater than the stray capacitance of the transformer, as underlined above.

Most advantageously, the ratio e/le is significantly greater than $1/\mu 0$ where e is the size of the gap, le is the mean length of the magnetic circuit, and $\mu$ is the intrinsic magnetic permeability of the material of the magnetic circuit.

As explained in greater detail below, under such circumstances the duration of the switching interval is essentially determined by a purely geometrical characteristic (the size of the gap), and is thus independent both of temperature (intrinsic magnetic permeability is a factor that varies considerably as a function of temperature), and of the very wide dispersion in permeability that is to be found from one core to another.

BRIEF DESCRIPTION OF THE DRAWINGS

An embodiment of the invention is described by way of example with reference to the accompanying drawings, in which:

FIG. 1 shows the general configuration of a push-pull converter using MOSFETs, together with the various stray capacitances associated with the components of the converter.

FIG. 2 is an equivalent circuit diagram of one of the legs of the FIG. 1 converter.

FIG. 3 is a graph showing how the magnetic permeability of the core in a given magnetic circuit varies as a function of the size of the gap.

FIG. 4 is a graph showing how the magnetization current varies for a given magnetic circuit as a function of the size of the gap.

FIG. 5 is a graph applicable to a computed example showing how the magnetizing inductance varies as a function of the size of the gap.

FIG. 6 is a drawing of one type of transformer core with air gap which can be used with the MOSFET switches according to the teachings of the invention.

DETAILED DESCRIPTION

FIG. 1 is a diagram showing the structure of a push-pull type DC to DC converter in which switching is performed by MOSFETs. The converter essentially comprises a transformer having two primary windings P1 and P2 mounted in opposition on either side of a center tap that receives the input direct voltage VIN. Two secondary windings S1 and S2 enable the resulting alternating voltage to be taken for rectification by means of diodes D1 and D2 so as to deliver an output voltage VOUT. Appropriate filter means (not shown) may also be provided. In addition, to clarify the drawing, the primary and secondary windings P1 and P2 and S1 and S2 of the two push-pull branches are drawn separately even though they are in fact wound on a single core.

Each of the primary windings P1 and P2 co-operates with a respective switching member T1 or T2 constituted in this case by respective power MOSFETs.

The drawing also shows in dashed lines the various stray capacitances: between the turns of the transformer windings, and between the drain and the source, between the gate and the drain, and between the gate and the source of each of the transistors T1 and T2.

The center tap of the primary windings P1 and P2 is connected to the direct voltage source VIN feeding the converter, with the other terminal (the opposite terminal) of each of the primary windings being selectively connected to ground via the corresponding switch T1 or T2. It will be observed that it would be equally possible to use the inverse configuration where the center tap is connected to ground and the opposite terminals of the primary windings are selectively connected in alternation to the voltage source VIN via the switches T1 and T2.

In this configuration, which is conventional, the two switches T1 and T2 are controlled appropriately by applying respective control signals to their gates G enabling them to operate in push-pull, i.e. in order to be able to switch one of the switches ON, the other one must necessarily be OFF.

One suitable control mode is described, for example, in above-mentioned FR-A-2 627 644, and reference may be made thereto for further details for one specific embodiment, although the present invention is not limited in any way thereto.

In any event, it will be observed that between the instant that one of the transistors switches OFF and the instant at which the other transistor switches ON, it is necessary to allow a sufficient time interval to elapse for the stray capacitances associated with the transistors to charge or discharge, as explained above.

FIG. 2 is an equivalent circuit diagram corresponding to either of the two legs of the FIG. 1 converter (where the term "leg" covers either P1, S1, T1 and D1, or else P2, S2, T2 and D2).

The following notation is used in the equivalent circuit diagram: VIN is the input voltage; VOUT is the output voltage; Rp is the resistance of the primary winding; Rc is the equivalent resistance representing losses within the magnetic circuit; Lp is the magnetizing inductance (as modified by the gap, see below); L1 is the leakage inductance; Cp is the stray capacitance of the transformer; and Rs is the resistance of the secondary winding.

Given the high operating frequencies, the core material is generally a ferrite.

According to the invention, the core of the magnetic circuit includes a gap whose size can be adjusted independently: as explained in detail below, the magnetizing inductance can be changed by acting on the size of the gap without modifying any of the other parameters. A drawing of one type of fixed gap transformer core with air gap which can be used to practice the teachings of the invention is shown in FIG. 6 to be discussed below. In embodiments using a fixed size gap, the size of the gap is set after determining the desired magnetizing inductance for the desired frequency and switching speed, and the transformer core is then manufactured with the correctly sized gap to establish this magnetizing inductance. In other embodiments, the size of the air gap can be varied by any means to adjust for differences in stray capacitances from one MOSFET switch pair to another to fine tune the magnetizing inductance to the actual stray capacitance conditions found for any particular pair of MOSFET switches and any given operating frequency. In the equivalent circuit of FIG. 2, this is symbolized by the sloping arrow through the magnetizing inductance Lp.

The way in which the various components interact is described below and the various factors governing this configuration are determined in accordance with the invention.

In conventional manner, for square waves in a transformer operating in push-pull, Maxwell's equation gives the flux B in the magnetic material as a function of the voltage E applied to the terminals of the winding, of the switching frequency Fs, of the cross-section of the magnetic material S, and of the number of turns N:

(1) $B = E/4.S.N.Fs$

In addition, the losses Pc within the magnetic circuit are a function of the switching frequency Fs, and of the flux B, as given by the equation:

(2) $Pc = k.B\alpha.Fs\beta$ where k, $\alpha$ and $\beta$ are parameters that are a function of the material used, with $\alpha$ and $\beta$ generally being about 2 for ferrites.

The primary inductance (the magnetizing inductance) Lm is given by:

(3) $Lm = Al.N2$ where Al is a characteristic that is a function of the magnetic permeability $\mu e$ of the material of the magnetic circuit as modified by the presence of the gap, and by a coefficient c which is a dimensional characteristic relating to the geometry of the magnetic circuit:

(4) $Al = \mu e.c$

The magnetizing inductance Lm given by applying equation (4) to equation (3) is itself used to determine the switching characteristic of the converter.

Assuming that the number of turns N is chosen in such a manner as to correspond to limiting conditions for losses within the magnetic circuit, it can thus be seen that only the parameter Al remains available for adjusting the switching characteristics of the converter, and that within Al, it is possible to modify only $\mu e$ if the geometry of the core is to remain unchanged.

The way in which such adjustment is performed in accordance with the teaching of the invention is described below.

Firstly, and above all, care must be taken to minimize the stray capacitance of the transformer by splitting, rectifying, and stacking the secondary windings as much as possible, in particular for high voltage applications.

Once the transformer has been defined in such a manner as to satisfy the loss conditions within the magnetic circuit and within the copper windings for the selected switching frequency, the magnetizing inductance Lm is then determined and the stray capacitance in each of the legs of the converters can be calculated and measured.

More precisely, the stray capacitance results from the drain-source and the drain-gate capacitances of the MOSFET transistor driving the transformer being connected in parallel with the stray capacitance of the transformer winding.

The resonant frequency of the assembly comprising the transformer plus the MOSFET in each branch is given by the following equation:

(5) $Fn = \pi/2.\sqrt{(Lm.Ceq)}$ where Ceq is the total stray capacitance as defined above.

This makes it possible to discover the duration of the time interval required for causing the push-pull converter to switch from one leg to the other, i.e. and in other words, the duration of the time interval required when one of the switches is OFF to cause the voltage across the other switch to fall to zero.

At this stage in the design process, the duration of this time interval may be too long for the selected switching frequency, thus leading to severe degradation of the form factor.

In accordance with the invention, the duration of the switching interval is controlled and given a value that adjusts the switching frequency without significantly modifying the design calculations for the transformer, with this being done by providing a gap in the magnetic material and by increasing the size of the gap until a satisfactory value is obtained for the magnetizing inductance. The introduction of this parameter modifies the magnetic permeability of the material in accordance with the following equation:

$$\frac{1}{\mu_e} = \frac{1}{\mu} + \frac{e}{l_e} \quad (6)$$

where $\mu e$ is the magnetic permeability of the material of the magnetic circuit as modified by the presence of the gap, $\mu$ is the intrinsic magnetic permeability of said material, e is the size of the gap, and le is the mean length of the magnetic circuit.

FIG. 3 shows how the parameter $\mu e$ varies as a function of the size of the gap for a given magnetic circuit. For a fixed number of turns, the product N.Lm is a function proportional to $\mu e$.

It may be observed that this method of determining the duration of the switching interval has no effect on the leakage inductance L1 of the transformer, which is important if this inductance is used as a parameter for a resonant configuration.

The leakage inductance L1 is a function solely of the geometrical characteristics of the transformer, once it has been wound. This value therefore depends, in fact, on the number of turns as specified by the following equation:

(7) $L1 = K.N2$ where K is a parameter that is a function of the size of the turns and of the distance between them, but is independent of $\mu$.

Naturally, the presence of a gap increases the magnetizing current for a given conduction time. However, this increase gives rise only to a relatively small corresponding increase in the conduction losses of the MOSFETs. In this respect, FIG. 4 shows how the magnetizing current at the end of conduction Imag varies as a function of the size of the gap, with the current being given by:

(8) $Imag = E.Tc/Lm$ where E is the voltage applied to the midpoint of the transformer and Tc is the duration of the conduction time interval.

In a specific example, a resonant converter of the same type as that described in above-mentioned FR-A-2 627 644 has been built to operate at a switching frequency capable of rising up to 900 kHz. The converter was built using a 34×17×11 ETD type magnetic circuit made of 3F3 type material and sold by Philips, for which Al=2250 ±25% and $\mu$=1450 ±25%.

Assume that the transformer primary N=10 turns, then the magnetizing inductance is Lm=A1×N2=2250×100=0.225 mH ±25%.

If a gap is now inserted in the magnetic circuit, above-specified equations (3), (4), and (6) give values for Lm as a function of the size e of the gap. These values are plotted to give the curve of FIG. 5 where the numerical values given correspond to a magnetic circuit having a mean length le=79 mm.

Inserting the gap considerably reduces the range of the dispersion in the value $\mu e$ since the ratio e/le can be adjusted to a value of a few percent, thus constituting the predominant term on the righthand side of equation (6) so the ±25% dispersion in $\mu e$ becomes marginal (the term $1/\mu e$ is less than 0.1% so its effect is very small).

In addition, the effect of temperature variations is also negligible even though $\mu e$ varies considerably with temperature (typically by 50% between 50° C. and 100° C.). Here again, these changes have a negligible effect on $\mu e$ so long as the term e/le (which is a purely geometrical term that does not vary with temperature) is predominant on the righthand side of equation (6). Referring to FIG. 6, there is shown one embodiment of a transformer core with air gap which can be used with a pair of MOSFET switches to practice the teachings of the invention. The transformer core is comprised of a toroidal ring of magnetically permeable material 10 having an air gap 12. A primary winding 14 has an output 16, an output 18 and a centertap input 20. A secondary winding 22 has an input 24 and an output 26. In the embodiment shown in FIG. 6, the size of the air gap is fixed, however, in other embodiments, the size of the air gap can be adjustable by any suitable mechanical means. The size of the air gap is set based upon the desired magnetizing inductance by using Equation (5) to solve for the resonant frequency of transformer and MOSFET structure and altering the size of the gap until this resonant frequency equals or is close to the desired switching frequency. Once the size of the air gap is determined for a given set of stray capacitances for a particular MOSFET configuration, all subsequent transformer cores may be manufactured with this size air gap. In alternative embodiments, the size of the air gap may be individually adjusted for each DC to DC converter built to match the resonant frequency of the transformer and the particular devices used in the MOSFET switch combination to match this resonant frequency to the desired switching frequency.

In a practical embodiment, it may be observed that calibrated papers of various different thicknesses (10 $\mu$m, 25 $\mu$m, etc.) exist and can be used for determining the size of the gap, thus making it easy to make such gaps and to adjust the sizes thereof accurately.

I claim:

1. A DC to DC converter having an input for coupling to a first terminal of a source of a first DC voltage, said source of a first DC voltage having first and second terminals across which said first DC voltage appears, and having an output at which a second DC voltage appears, comprising:

a transformer having a core defining a magnetic circuit with an air gap therein, said core having wound thereabout a primary winding having first and second outputs and a centertap input coupled to said DC to DC converter input for direct coupling to said source of said first DC voltage, and having a secondary winding wound around said core, said secondary winding having at least two outputs;

first switch means coupled to said first output of said primary winding and for coupling to said second terminal of said source of said first DC voltage, and having an input for receiving a first switching control signal which alternates between first and second states at a switching frequency, for causing DC current to periodically flow between said centertap input and said first output of said primary winding when said first switching control signal is in said first state and for blocking said current flow when said first switching control signal is in said second state;

second switch means coupled to said second output of said primary winding and for coupling to said second terminal of said source of said first DC voltage, and having an input for receiving a second switching control signal which alternates between first and second states at said switching frequency, said second switching control signal being complementary to said first switching control signal in that when said first switching control signal is in said first state, said second switching control signal is in said second state, and when said first switching control signal is in said second state, said second switching control signal is in said first state, for causing DC current to periodically flow between said centertap input and said second output of said primary winding when said second switching control signal is in said first state and for blocking said current flow when said first switching control signal is in said second state;

rectifier means coupled to said secondary winding for rectifying the currents flowing therein and outputting said second C voltage at said output of said DC to DC converter; and wherein said first and second switching means have associated therewith stray capacitances that are charged and discharged as said first and second switching means switch on and off, and wherein said primary winding has a predetermined number of turns and a magnetizing inductance which combines with said stray capacitances to define a transition time for transition between a state where said first switching means is conducting to a state where said second switching means is conducting and said first switching means is not conducting, the size of said gap in said transformer core being established so that said magnetizing inductance of said primary winding is reduced to a value that establishes said transition time at a predetermined value less than a threshold value.

2. The apparatus of claim 1 wherein the number of turns in said primary winding is limited to the number of turns which cause an acceptable level of losses within said transformer.

3. The apparatus of claim 1 wherein the size of said gap is established so as to cause the value of said magnetizing inductance to be reduced to a value that is less than a threshold value for a magnetizing inductance established based upon a predetermined level of switching losses given the size and weight of said transformer.

4. The apparatus of claim 3 wherein said gap has a size e and wherein said magnetic circuit has a length Le and wherein said magnetic circuit has a magnetic permeability $\mu$ and wherein said gap size is established such that e/Le is significantly greater than $1/\mu$.

5. The apparatus of claim 1 wherein said first and second switching means are MOSFET switching transistors.

* * * * *

UNITED STATES PATENT AND TRADEMARK OFFICE
CERTIFICATE OF CORRECTION

PATENT NO. : 5,249,113

DATED : September 28, 1993

INVENTOR(S) : Perol et al

It is certified that error appears in the above-identified patent and that said Letters Patent is hereby corrected as shown below:

Column 3, line 4, change "$1/\mu 0$" to --$1/\mu$--

Signed and Sealed this

Second Day of August, 1994

Attest:

BRUCE LEHMAN

Attesting Officer     Commissioner of Patents and Trademarks